B. IRVING.
Bark Mill.
No. 86,675.  Patented Feb. 9, 1869.
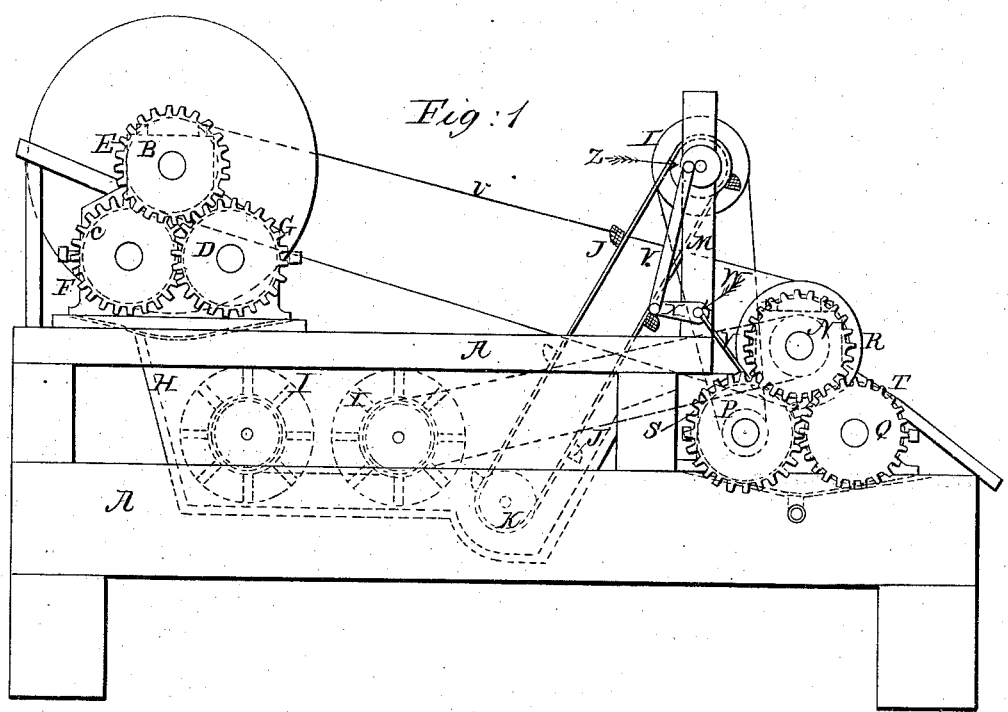
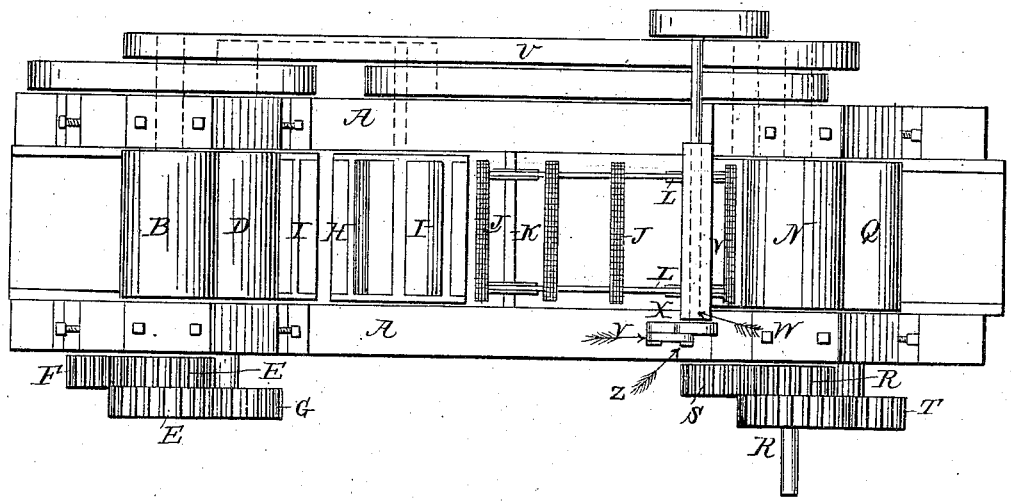

United States Patent Office.

BENJAMIN IRVING, OF NEW YORK, N. Y., ASSIGNOR, BY MESNE ASSIGNMENT, TO SOUTH BOSTON IRON COMPANY.

Letters Patent No. 86,675, dated February 9, 1869.

IMPROVED FEED-REGULATOR FOR BARK-MILLS.

The Schedule referred to in these Letters Patent and making part of the same.

*To all whom it may concern:*

Be it known that I, BENJAMIN IRVING, of the city, county, and State of New York, have invented certain new and useful Improvements in Apparatus for Regulating or Distributing the Feed of Crushed Bark to the Tail or Compresser-Rollers of a Bark-Crushing Machine, for obtaining the extract therefrom; and hereby declare that the following is a full description of the same, reference being had to the accompanying drawings, of which—

Figure 1 is a side elevation of a bark-crusher machine, showing the feed-distributing apparatus attached thereto, and Figure 2 is a plan view of the same, in which the blue outlines show the belts for connecting the various parts of the machine together, and the red outlines, the main gearing-wheel, the same letters of reference, wherever they occur, referring to like parts.

Letter A is the frame of the machine, on the front end of which is arranged a series of three crusher-rollers, B, C, and D, geared together by cog-wheels E, F, and G, as described in my previous invention of a bark-crusher machine.

Underneath these rollers is arranged, between the side-rails of the frame, *a*, water-bath, H, in which are arranged paddle or agitator-wheels I, for the purpose of stirring up the fibrous mass of bark falling into the bath from the crusher-rollers, and at the same time carrying it back to and upon an elevator, J.

This elevator is formed as an endless belt, running under a roller, K, in the bottom of the water-bath, and up over a roller, L, secured between posts M, projecting up from the side-rails of the frame, near its back end, and has on it a series of wire-gauze buckets.

By this means, the mass of fibrous crushed bark is taken from the water-bath, and discharged upon and between a series of three-tail or compresser-rollers, N, P, and Q, geared together by cog-wheels R, S, and T, and, by means of belts U, connected with the front series of rollers, to rotate simultaneously with them, and thus extract or compress the liquor from the mass of bark as fast as made and delivered to them.

To feed the pulpy mass of bark into and between the tail or compresser-rollers, it is made to fall from the elevator-buckets upon a feed-distributer plate, V, (shown in yellow outline,) secured to a rock-shaft, W, arranged between the posts M of the frame, and having its lower edge constantly resting upon the periphery of the back lower roller P, of the series of tail-rollers.

To vibrate the rock-shaft, a lever, X, is attached to one end of it, and by means of a connecting-rod, Y, attached to a crank-pin, Z, on the end of the upper elevator-roller shaft, having a less diameter or throw than that of the lever X, its rotation vibrates the rock-shaft W, and thus keeps the distributer-plate V constantly in motion, to shovel, as it were, the pulpy mass of bark in between the rollers.

It will be obvious, from the nature of the material, that, if discharged upon a fixed or stationary trough, it would soon lodge and choke up, or would, at other times, accumulate in too great quantities at one time between the rollers, to have them compress the extract out thoroughly, even if it did not have the effect of breaking the rollers down by over-work.

By my invention, the object is to distribute the feed evenly and constantly over the surface and between the rollers as fast as it falls from the elevator-buckets, and thus automatically keep up the continuous operations of the entire machine.

Having now described my invention, I will proceed to set forth what I claim, and desire to secure by Letters Patent of the United States.

I claim the combination of the feed-distributer plate V with the rock-shaft W, lever X, and rod Y, all arranged substantially as described and for the purposes hereinbefore set forth.

Witnesses:           BENJAMIN IRVING.
  FRANKLIN BARRITT,
  CHARLES L. BARRITT.